United States Patent
Abrams et al.

(10) Patent No.: US 6,625,812 B2
(45) Date of Patent: *Sep. 23, 2003

(54) METHOD AND SYSTEM FOR PRESERVING AND COMMUNICATING LIVE VIEWS OF A REMOTE PHYSICAL LOCATION OVER A COMPUTER NETWORK

(76) Inventors: David Hardin Abrams, 2318 N. Southport Ave., Apt. 3F, Chicago, IL (US) 60614; Peter Nicholas Prokopowicz, 910 Fair Oaks Ave., Oak Park, IL (US) 60302

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,084

(22) Filed: Oct. 22, 1999

(65) Prior Publication Data

US 2002/0138847 A1 Sep. 26, 2002

(51) Int. Cl.[7] ................................................ H04N 7/173
(52) U.S. Cl. ....................................... 725/105; 348/154
(58) Field of Search ................................ 725/106, 107, 725/100, 111, 112, 113, 120, 86, 105, 104; 348/154, 155, 143, 148, 152, 158, 159, 207, 211, 373; 345/327; 370/254; 709/206, 250, 115, 116, 201, 203, 202, 204; 395/800.02; H04N 7/173

(56) References Cited

U.S. PATENT DOCUMENTS

| | | | |
|---|---|---|---|
| 3,984,628 A | | 10/1976 | Sharp |
| 5,068,735 A | | 11/1991 | Tuchiya et al. |
| 5,218,627 A | | 6/1993 | Corey et al. |
| 5,343,386 A | | 8/1994 | Barber |
| 5,587,740 A | * | 12/1996 | Brennan ..................... 348/373 |
| 5,598,209 A | | 1/1997 | Cortjens et al. |
| 5,867,484 A | * | 2/1999 | Shaunfield .................. 370/254 |
| 5,877,801 A | | 3/1999 | Martin et al. |
| RE36,207 E | * | 5/1999 | Zimmermann et al. ...... 348/207 |
| 5,909,589 A | * | 6/1999 | Parker et al. ........... 395/800.32 |
| 6,014,689 A | * | 1/2000 | Budge et al. ............... 709/206 |
| 6,018,774 A | * | 1/2000 | Mayle et al. ............... 709/250 |
| 6,092,078 A | * | 7/2000 | Adolfsson ................... 707/102 |
| 6,160,544 A | * | 12/2000 | Hayashi et al. ............. 345/327 |
| 6,182,116 B1 | * | 1/2001 | Namma et al. ............. 709/204 |
| 6,239,836 B1 | * | 5/2001 | Suzuki et al. ............... 348/211 |
| 6,266,082 B1 | * | 7/2001 | Yonezawa et al. .......... 348/159 |
| 6,351,762 B1 | * | 2/2002 | Ludwig et al. ............. 709/204 |

FOREIGN PATENT DOCUMENTS

| | | |
|---|---|---|
| EP | 0 917 376 A2 | 5/1999 |
| EP | 0 944 260 A2 | 9/1999 |
| JP | 63-284990 | 11/1988 |
| JP | 10-164555 | 6/1998 |
| JP | 11-027570 | 1/1999 |
| JP | 11-027766 | 1/1999 |
| JP | 11-205653 | 7/1999 |
| WO | PCT/US92/04237 | 11/1992 |

* cited by examiner

*Primary Examiner*—Chris Kelley
*Assistant Examiner*—Tung Vo

(57) ABSTRACT

Method and system for preserving and communicating live views of a remote physical location over a computer network. The present invention integrates so-called "telepresence" systems with a user interface that allows the user to capture views of a remote physical location. Users navigate a remote physical location by viewing images captured by cameras in the remote location and remotely controlling the cameras by means of a user interface to capture more images of other selected regions within the location. The present invention allows the user to preserve views of the remote physical location as the user navigates. These views can then be saved for later use by the user or communicated to others. In one embodiment, views saved or communicated can be activated to connect users to the live image source.

17 Claims, 7 Drawing Sheets

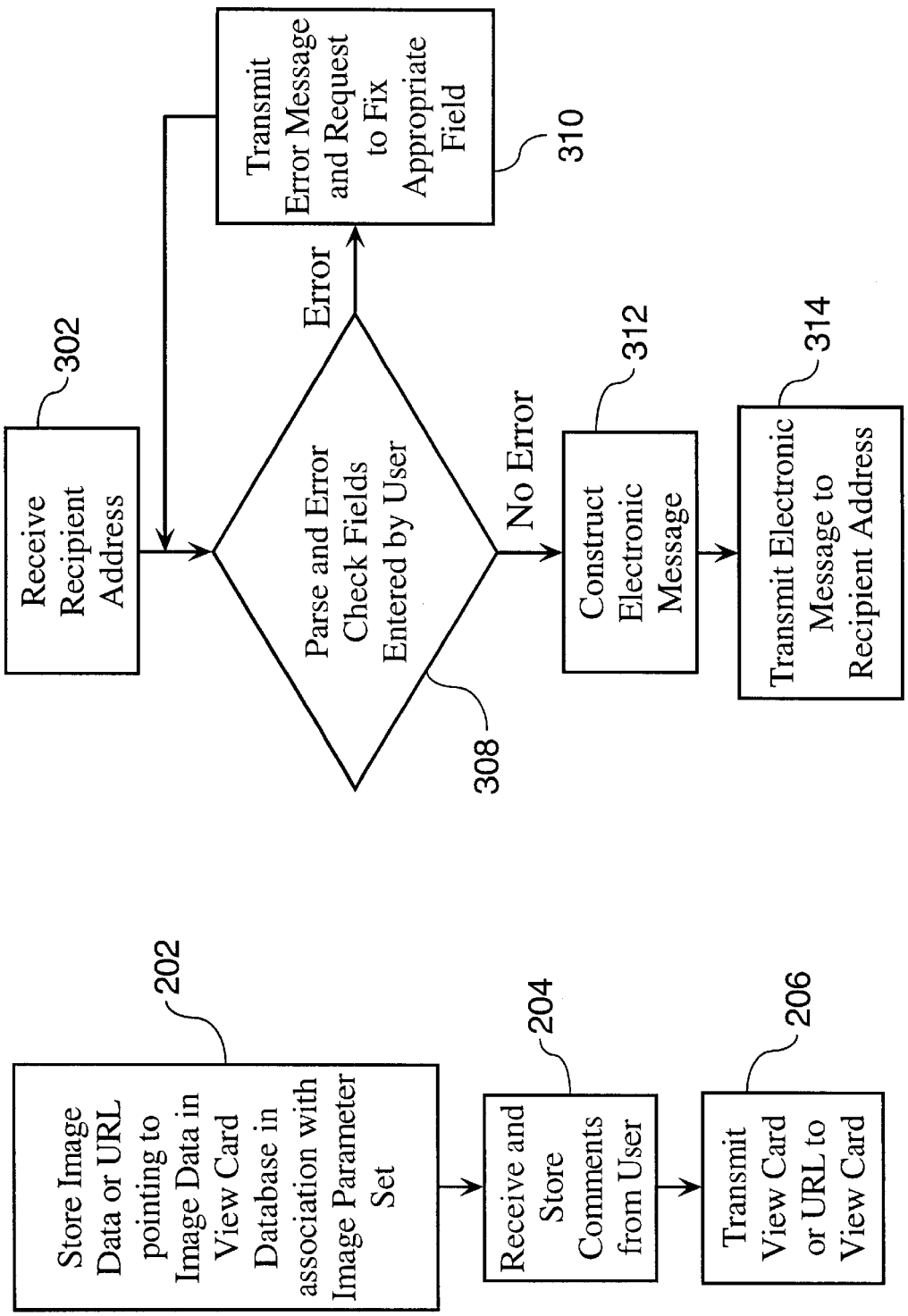

METHOD AND SYSTEM FOR PRESERVING AND COMMUNICATING LIVE VIEWS OF A REMOTE PHYSICAL LOCATION OVER A COMPUTER NETWORK

FIELD OF THE INVENTION

The present invention relates to telepresence systems and computer networks. More particularly, the present invention relates to methods and systems for communicating live views of a remote physical location over a computer network.

BACKGROUND OF THE INVENTION

Exchanging picture images is an important and effective method of communicating experiences and information. People exchange photographs and postcards to share images and experiences of remote physical locations and events. Accordingly, a variety of technologies have made the communication of images possible. For example, traditional postcards provide a high-quality image and a space to include a small message and a recipient address. U.S. Pat. No. 4,953,780 and U.S. Pat. No. 3,847,325 disclose methods for converting personal photographs into postcards. In addition, U.S. Pat. No. 5,587,740 discloses a kiosk equipped with a digital camera that takes a picture of those inside the kiosk and generates a postcard of the picture overlaid on a scenic background.

In the on-line world, electronic postcards have become a popular way to share one's on-line browsing experience with another. U.S. Pat. No. 5,760,771 discloses a structured tour of hypertext files in which a user may e-mail an electronic postcard containing a hypertext page or a link thereto to another user connected to the network. For example, certain on-line store web sites allow users to transmit a link to a catalog entry to friends or colleagues via e-mail. In addition, multimedia elements, including music and animation, can also be sent as electronic postcards. U.S. Pat. No. 5,764,276 discloses a system that provides a simulated video tour of a physical location through a low-bandwidth connection to a computer network.

Telepresence systems have also emerged as a powerful tool for acquiring images of remote physical locations. "Telepresence" refers to techniques and systems for acquiring, processing and delivering live, interactively-controlled, digital video and/or still images of a remote physical location over a computer network. Typically, visual telepresence systems involve the use of computer-controlled camera systems which are controlled remotely by users across a computer network. Users aim the camera by adjusting the pan, tilt and zoom to select regions of interest in a remote physical location via a user interface. Many conventional telepresence systems allow multiple users to share control of a live video source. Typically, telepresence gives every user the feeling of independent control of the image acquisition system, even though other users are concurrently using the system. Telepresence systems can be found, for example, at various scenic locations, manufacturing plants, construction sites, retail stores, and media events.

The sharing of images generated by such telepresence systems can be an effective tool for collaboration. For example, a construction contractor may want to share a live image of a construction site with management as a means of reporting on the status of a project. Prior art telepresence systems, however, do not allow users a convenient and efficient way to collaborate by sharing live views of remote physical locations. Accordingly, a need exists for methods and systems for communicating live views of remote physical locations over a computer network. The present invention substantially fulfills this need.

SUMMARY OF THE INVENTION

The present invention provides methods and systems for preserving and communicating live views of a remote physical location over a computer network. The present invention integrates so-called "telepresence" systems with a novel user interface that allows the user to visually navigate a remote physical location, select live views of the remote physical location, and preserve the live views. According to the invention, preserved live views can be saved for later use or communicated to others. In one embodiment, the live views preserved by the present invention provide an automatic connection to the live image source.

The present invention provides an easy-to-use mechanism that allows users to share views of a remote physical location. In one embodiment, users navigate a remote physical location by viewing images captured by cameras in the remote location and remotely controlling the cameras by means of a user interface to capture more images of other selected regions within the space. The user interface allows the user to preserve views of the remote physical location as the user navigates. A user can then opt for the user interface to construct a transmittable page containing the live view, referred to here as a "view card." In one embodiment, the electronically transmittable view card comprises a user interface with the preserved live view, a message from the sender, and communication information such as email addresses. The present invention also provides the recipient of the view with a fluid connection to the live image source such that the recipient can activate the connection to the original image source and independently explore the remote physical location in more detail. Therefore, in effect, the present invention allows a user of a computer network to view and navigate a location, live, anywhere in the world, and send a kind of electronic postcard (a view card) of what he sees to another user. Moreover, the present invention allows the view card recipient to seamlessly connect to the live remote source and visually navigate the space himself.

For example, a user views a page-based user interface that shows him a live view of a remote physical location. From this "live view selection page" the user can control a camera at the remote location simply by clicking on the presented image or by using other controls on the page. In this manner, the user visually navigates the remote space (panning, zooming, etc.) and selects various live views. The live view selection page allows the user to preserve any live view. To communicate a preserved view to another user, the user clicks the "Create View Card" button. A view card construction page appears and the user enters the recipient's email address and a message about the preserved view. To communicate the view card to the designated recipient, the user clicks "Send View Card." The recipient, when viewing the page-based view card, sees the preserved live view, the message from the other user, and the communication information. By clicking on the image in the view card, the recipient can activate the preserved view such that the view card page is replaced by a live view selection page showing the current, live image captured by the camera at the remote location. Now the recipient can visually navigate the remote location in exactly the same way as the sender of the view card. By means of the present invention's easy-to-use page-based interfaces, users can share live views and collaborate with respect to real-time events at a remote location.

In one aspect, the present invention provides a system for preserving live views of a remote physical location over a computer network comprising a user interface and an image acquisition system, both coupled to the computer network. The image acquisition system transmits an image of the remote physical location over the computer network to the user interface. The user interface displays images received over the computer network and facilitates the generation of an image parameter set. According to one embodiment of the invention, the image parameter set defines a selected region in the remote physical location. In one embodiment, the user interface allows the user to generate a link, wherein the link is operable to transmit control signals to the image acquisition system. In one embodiment, the link designates a selected region in the remote physical location.

The present invention also provides methods for preserving live views of a remote physical location. In one aspect, the method of the present invention contemplates a computer network including at least one client computer and at least one server coupled to an image acquisition system located in a remote physical location. The method comprises (a) receiving, at a server, a request for an image of a selected region in the remote physical location; (b) transmitting the image in response to the request; (c) receiving a request to preserve a view; and (d) generating an image parameter set. According to the invention, the image parameter set defines the selected region in the remote physical location. According to one embodiment of the invention, the image parameter set defines the selected region in relation to the positional parameters of the image acquisition system. In certain embodiments, the parameter set is transmitted to the user.

The present invention also provides apparatuses directed to preserving and/or communicating live views of a remote physical location over a computer network. The apparatus according to one aspect of the present invention comprises a server operably coupled to the computer network to receive requests and an image acquisition system operably coupled to the server. The image acquisition system captures images of selected regions in the remote physical location and transmits the image to the server. The server transmits interface data to the user, including the image of the selected region. According to the invention, the server, in response to a request, generates an image parameter set. In one embodiment, the server transmits the image parameter set to the user. In another embodiment, the server receives a recipient address from the user and transmits the image parameter set to the recipient address.

In another aspect, the present invention provides an apparatus for communicating live views of a remote physical location a computer network. The apparatus comprises a view card database including a list of view card identifications and image parameter sets corresponding to the view card identifications, and a processor coupled to the view card database. The processor is operably coupled to the computer network to receive a view card identification. According to the invention, the processor accesses the view card database to retrieve the image parameter set corresponding to the view card identification. In one embodiment, the apparatus further comprises an image acquisition system located in the remote physical location and operably coupled to the processor.

A remote physical location refers to an actual physical space or location remote from the user. It is remote only in the sense that it is perceived through a user interface displayed on a computer screen or other suitable device. Accordingly, a remote physical location can include within its bounds a user of the system.

Telepresence refers to techniques and systems for acquiring, processing and delivering live, interactively-controlled, digital video and/or still images of a remote physical location over a computer network. Typically, visual telepresence systems involve the use of computer-controlled camera systems which are controlled remotely by users across a computer network. Users aim the camera by adjusting the pan, tilt and zoom to select regions of interest in a remote physical location. Many conventional telepresence systems allow multiple users to share control of a live video source. Typically, telepresence gives every user the feeling of independent control of the image acquisition system, even though other users are concurrently using the system. Real-time refers to an interactive user experience in which the server transmits video or still images within seconds of the user's request.

DESCRIPTION OF THE DRAWINGS

FIG. 5 is a flow-chart diagram setting forth a method according to the present invention.

FIG. 6 is a flow-chart diagram illustrating a method according to the present invention.

DETAILED DESCRIPTION OF THE INVENTION

Figure 1:
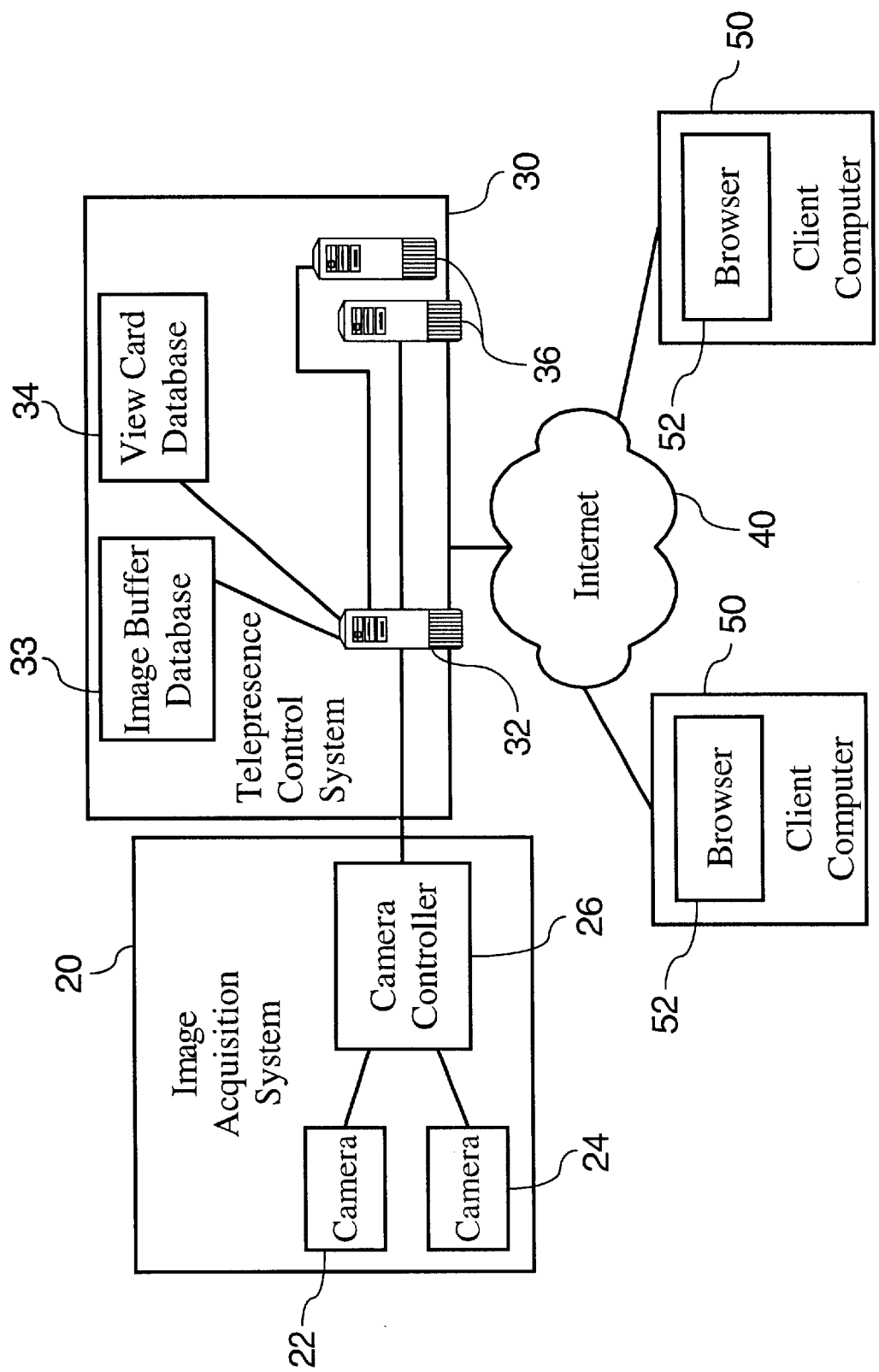
FIG. 1 is a functional block diagram illustrating a system of the present invention as applied to a computer network.

FIG. 1 shows an embodiment of the system of the present invention. One embodiment of the present invention generally involves at least one client computer 50 and at least one telepresence control system 30, both of which are connected to the Internet 40. The embodiment of FIG. 1 further includes image acquisition system 20 located in a remote physical location and operably connected to telepresence control system 30. The present invention can be applied across any computer network. Furthermore, the computer network can be any suitable computer network, including but not limited to, a wireless computer network, an electronic network, and an optical network. In addition, communication between client computer 50 and telepresence control system 30 can occur via a dedicated line.

According to one embodiment of the present invention, remote physical location 60 is a retail space containing products 66. (See FIG. 8.) In one form, remote physical location 60 is a conventional retail showroom. Accordingly, the present invention allows a user to send a live view of a product 66 to another. However, the present invention can be applied to any remote physical location. For example, the remote physical location may be a construction site. According to this embodiment, a construction manager may transmit live views of selected regions of the construction site to a sub-contractor, who can view the construction site and make a bid on work to be performed at the site. The present invention can also be used to monitor the status of construction at the site.

A. Telepresence Control System

Telepresence control system 30 receives requests for live images of selected regions of a remote physical location from users, receives images from image acquisition system 20, and transmits image data to users in response to their requests. Telepresence control system 30, in one embodiment, includes web or Internet servers 36, which receive requests submitted by users and transmit files and other documents in return. According to the first embodiment of the present invention, telepresence control system 30 further includes image server 32, image buffer database 33, and view card database 34. As FIG. 1 shows, image server 32 is operably connected to image acquisition system 20. Image server receives requests for images of regions in a remote physical location, receives images from image acquisition system 20 and transmits image data to users. Image buffer database 33 stores images of selected regions in a remote physical location captured by image acquisition system 20. As more fully described below, view card database 34 stores image parameter sets relating to images of selected regions in a remote physical location. One skilled in the art will recognize from the description provided below that the division of functionality between servers 32 and 36 is not required by any constraint and that all the functions performed by servers 32 and 36 may be performed on one server.

Image buffer database 33 and view card database 34 can be any form of database known in the art (for example, a relational database or flat-file database). In one embodiment, each database has associated therewith a collection of computer programs enabling the storage, modification, and extraction of information in the database. The databases may be stored on any suitable device ranging from personal computers (for small systems) to mainframes (for large systems). In addition, the functionality of servers 32 and 36 may be implemented in hardware or software, or a combination of both. In one embodiment, each server is a programmable computer executing computer programs, comprising at least one processor, a data storage system, at least one input device, and at least one output device. In addition, as one skilled in the art will recognize, the databases described above may reside on image server 32 or web server 36, or may be physically separate, but operably connected thereto.

B. Image Acquisition System

Figure 8:
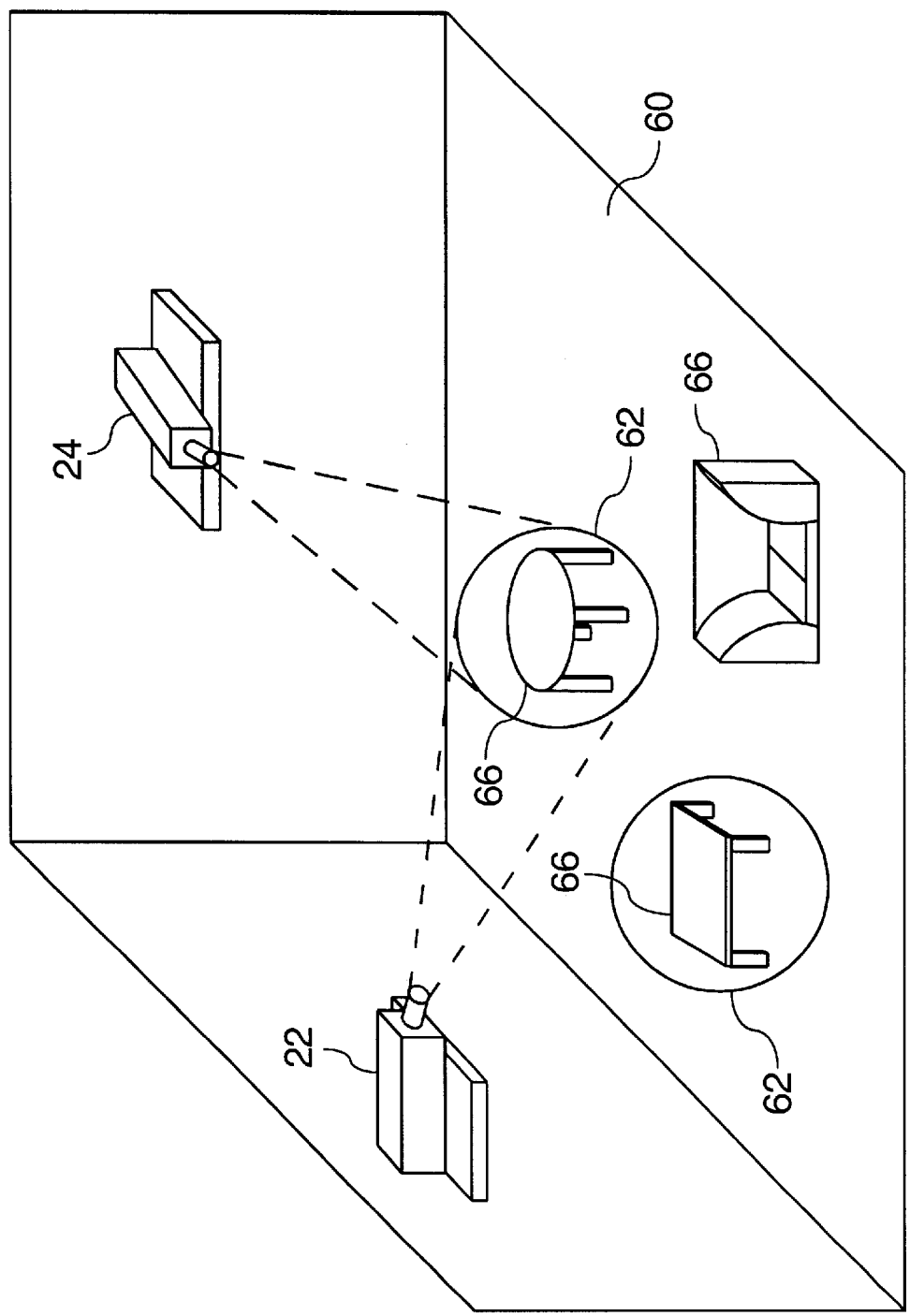
FIG. 8 is a perspective view of a remote physical location according to one embodiment of the present invention.

Image acquisition system captures images of a remote physical location and transmits image data to image server 32. As FIGS. 1 and 8 illustrate, in the first embodiment, image acquisition system 20 comprises cameras 22 and 24 operably coupled to and controlled by camera controller 26. Cameras 22 and 24 capture images of selected regions 62 in remote physical location 60. Of course, any number and combination of cameras and device controllers may be used. In another embodiment, the image capture, control and compression functionality of camera controller 26 may be embedded in cameras 22 and 24. In the embodiment shown in FIG. 1, however, camera controller 26 receives control signals from server 32 designating selected regions of a remote physical location. Camera controller 26, in response to such control signals, selects a camera, changes the position (pan and tilt, for example) and magnification (zoom) of the selected camera such that it captures the desired image of the selected region 62. In other embodiments, the image acquisition system comprises a single fixed camera returning a live still or video image of a remote physical location.

Figure 4:
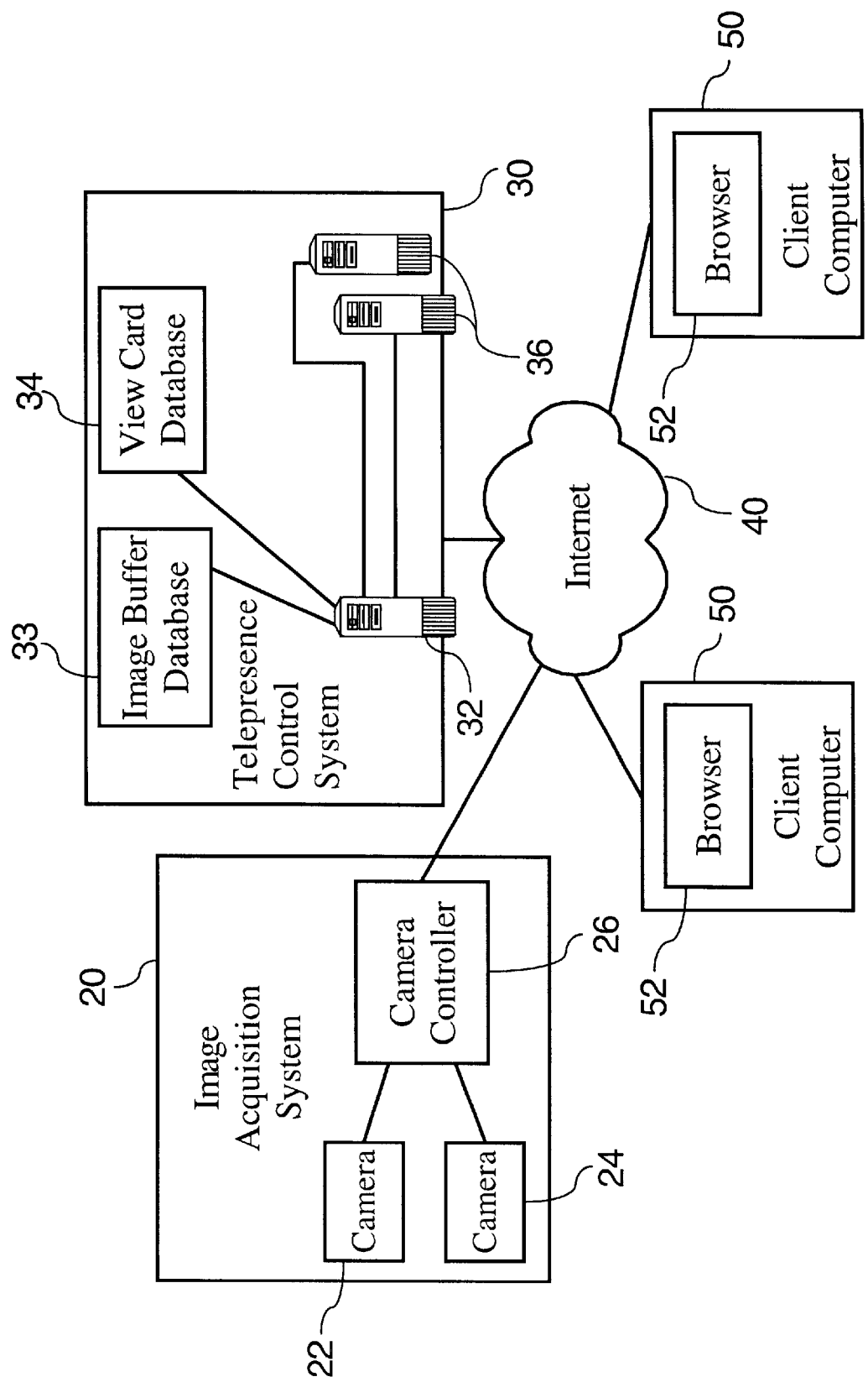
FIG. 4 is a functional block diagram illustrating an alternative implementation of the system of the present invention.

A variety of communication paths between camera controller 26 and image server 32 are possible. As FIG. 1 illustrates, camera controller 26 can be directly connected to server 32. Such a connection could also occur via a local area network (LAN) or a wireless communication system. Alternatively, as FIG. 4 illustrates, communication between camera controller 26 and image server 32 can occur via the Internet 40 or other wide-area network. Additionally, image acquisition system and image server 32 can be in the same physical space. Moreover, the functionality of image server 32 can be incorporated into camera controller 26.

In one embodiment, cameras 22 and 24 are computer-controlled cameras, whose pan, tilt (angular positions) and zoom settings are controlled and adjusted electro-mechanically by servo motors, as is conventional. In addition, cameras 22 and 24 could be movably mounted on tracks located at the remote physical location. Their position on the track could be similarly controlled by servo motors. Cameras 22 and 24 can be video cameras or still cameras. In addition, cameras 22 and 24 can be analog cameras, whose signal is digitized by a conventional frame-grabber. Cameras 22 and 24 can also be digital cameras, or any other suitable camera system. In the first embodiment, cameras 22 and 24 are analog cameras that take still images. According to this embodiment, camera controller 26 includes a frame-grabber board or other suitable device for digitizing the camera signal. According to one embodiment, camera controller 26 converts the resulting image into a JPEG or GIF (or any other suitable format) image data file before it is transmitted to image server 32. In other embodiments, the camera signal is transmitted to image server 32, which converts the signal into a suitable format.

Additionally, currently available telepresence systems of widely varying configurations may be employed in the present invention. For example, other embodiments of the present invention may employ cameras having a fixed angular position with wide-angle view systems (including parabolic or "fish eye" lenses) such that displacement of the camera in the pan and tilt directions is unnecessary to capture images of the entire remote physical location. U.S. Pat. No. 5,877,801 provides an example of such a telepresence system. According to the '801 patent, the camera system transmits a distorted image of the entire field of view to a local site that processes the image data to display that portion of the image selected by the user. In one embodiment employing such a camera system, image server 32, or a device controller connected thereto, processes the distorted image to derive the image of the selected region designated by the control signals from the user interface. Still further, the image acquisition system may include an array of cameras extending radially from a common point in combination with software to stitch the resulting images together, as offered by Infinite Pictures Corporation as part of its "SmoothMove" Technology. Other suitable camera systems include a fish eye lens and de-warping and spherical viewing image processing software, such as that disclosed in U.S. Pat. No. Re. 36,207. Other suitable systems may include a camera system using a convex mirror disclosed in U.S. Pat. No. 5,760,826.

C. User Interface

The user interface according to the present invention allows users to navigate remote physical location 60 by receiving images of selected regions therein and allowing the user to designate a new selected region for viewing. In one embodiment, users, employing the controls provided by the user interface, remotely control image acquisition system 20 via image server 32. The user interface also allows users to preserve various views of remote physical location 60. According to the invention, these views can be stored for later use or transmitted to another user. As FIG. 1 shows, one embodiment of the user interface is implemented using page-based interfaces transmitted to a conventional computer 50 having an Internet browser 52 and a connection to the Internet 40. The user's computer 50 can be any computer, special-purpose computing device, or any other suitable device for performing the required functionality. In one embodiment, user computer 50 includes at least one processor, a data storage system (including volatile and non-volatile media), a keyboard, a display, at least one input device and at least one output device. In one embodiment, the user's computer is connected to the Internet via a modem dial-up connection or through a network line. Such communication, however, could also be wireless. In addition, although embodiments of the system are described as working in conjunction with a browser, any suitable device or application for receiving, displaying and transmitting data over a computer network can be used with the present invention.

The use of page-based interfaces is desirable since such interfaces work on most browsers. However, the interface may also be provided on the user's computer via a Java applet or a client-side plug-in which the user downloads prior to using the system. In these embodiments, servers 32 and 36 transmit interface data (such as image data) which the applet or plug-in receives and displays on the user interface appearing on the user's computer. The interface may also be provided by a separate, special purpose application, which operates independently of a browser. Additionally, the present invention may work in conjunction with a special purpose kiosk or WebTV player. In addition, the interface can also be implemented on a hand-held device, such as a PALM PILOT®.

D. View Card

Figure 7:
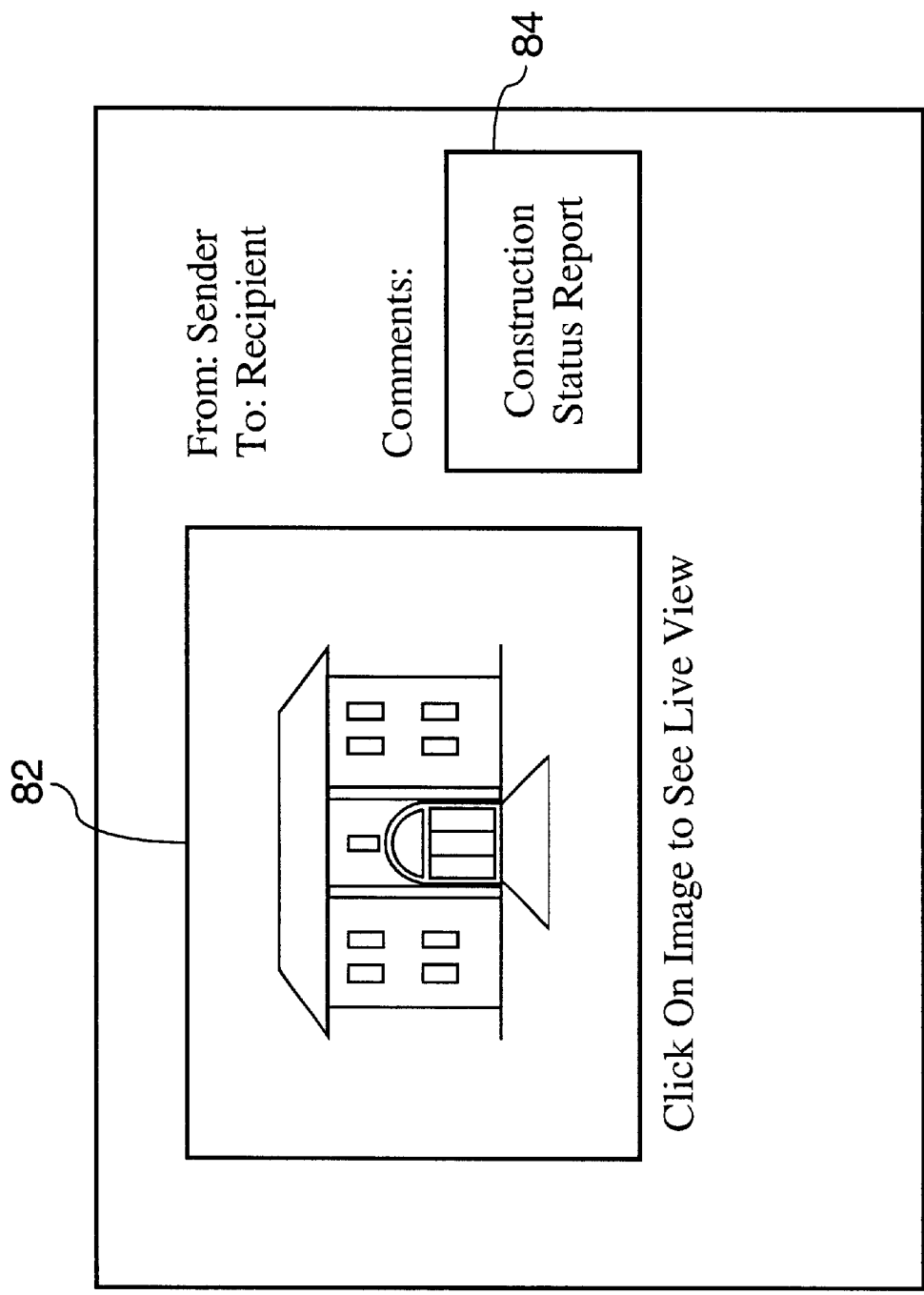
FIG. 7 shows a view card according to one embodiment of the present invention.

As discussed more fully below, the present invention provides users the ability to preserve views and construct view cards (see FIG. 7) comprising an image parameter set and the image currently viewed by the user. According to the invention, an image parameter set includes at least one parameter relating to the location of the selected region displayed as an image to the user. The image parameter set may include other parameters such as compression and brightness. In one embodiment, the image parameter set is configured such that a recipient of the view card can activate the image parameter set and receive a new live image corresponding to the image parameter set.

The present invention's ability to preserve and transmit live views allows for a new form of collaboration and, by extension, new possibilities for problem solving. By exchanging live views, two (or more) parties can collaborate about a situation unfolding at a location remote from all parties. View cards, thus, enhance communication between parties by involving everyone in relevant transpiring events; viewers become participants by exploring a remote site for themselves and pushing the collaborative process forward in a way not previously possible.

The present invention also makes many new applications possible. For instance, view cards have potential ramifications for electronic commerce. If a retail store has mounted live cameras and connected them through a network, an on-line shopper can send a view card to a sales representative upon viewing an interesting product in the store. The two can then exchange information about the item they are both seeing. In addition, a shopper can send a view card to a friend, spouse or colleague to get a second opinion on an item. The other person can then explore the retail store from the viewpoint selected by the original shopper. Thus, a shared, collaborative, shopping experience emerges through the use of view cards.

View cards also have marketing potential. A marketer can send out a single view card to a large list or group of users following the metaphor of direct mail. When the target population reads the view card, they can simply click in the picture to activate the view of the vacation destination, live media event, professional conference, new product demonstration, etc. The view card has the effect of drawing the population back into the live view. View cards can also promote "word-of-mouth" communication within a population. When one user finds a live view interesting, he/she can easily share it with another. The view card recipient then activates the live camera and sends a view card to a different user. In this way, visual information can quickly spread among a large group of users.

The present invention also allows for transmission of images and views to, and among, any variety of shared electronic communication and/or collaboration resources. For instance, a view card or link to a view card can be transmitted to a chat room, newsgroup, bulletin board, messaging device, interactive video game, user created collage or puzzle, or image viewing or projection device.

Operation

In one embodiment, a user at client computer 50 accesses telepresence control system 30 using browser 52 or any other suitable application. As is conventional, web servers 36 receive requests from client computer 50 and transmit data in response. According to one embodiment of the present invention, servers 36 receive image data from image server 32, construct page-based interfaces (see FIG. 3) including the image data, and transmit them to browser 52. The page-based interfaces allow users to remotely control image acquisition system 20 in order to navigate the remote physical location. As more fully discussed below, the page-based interface allows the user the option to generate a link to a page containing a live image of the remote physical location. In one form, the link, when activated, causes browser 52 to construct a request for an image that includes the positional parameters required for the image acquisition system to capture the selected region of the remote physical location. In one embodiment, the request constructed by browser 52 comprises a Uniform Resource Locator ("URL") encoding the required positional parameters. An image parameter set comprises at least one positional parameter of an image acquisition system corresponding to an image. In one embodiment, the positional parameter relates to the actual positional parameter of a camera. In embodiments employing stationary cameras (such as a camera incorporating a fish eye lens) and image processing algorithms, the positional parameters relate to location of the selected region in the image captured by the stationary camera. In other embodiments, image parameter sets may also include other camera or image parameters, such as brightness and compression.

More specifically and in one embodiment, when a user request comes to server 32 (FIG. 2, step 102), server 32 directs image acquisition system 20 to capture a new picture (image) of a selected region 62 in remote physical location 60 (step 104). In one embodiment, when the user request does not designate a selected region of the remote physical location, the first image taken and ultimately transmitted to the user is taken from a so-called default camera oriented at default pan, tilt and zoom values. This "default" image typically provides a user a view of the entirety of the viewable space. As discussed above, camera controller 26 moves the selected camera 22 (for example) to the default positional parameter values (pan, tilt, and zoom, in one embodiment) and causes camera 22 to take a live picture. In one embodiment, camera controller 26 includes a conventional frame grabber, which digitizes the image. Camera controller 26 further converts the digitized image into a JPEG image file (or any other suitable image file format) and transmits the image file to image server 32. In one embodiment, server 32 stores the file in image buffer database 33. In one form, the positional parameters of the camera (pan, tilt and zoom values) are encoded into the file name pointing to the stored image file. In embodiments where the image acquisition system 20 includes more than one camera system, the identity of the camera that captured the image is encoded into the file name. Other parameters, such as the time and/or date at which the image was taken, may be encoded in the file name, as well. In addition, one skilled in the art will recognize that image server 32 need not store the image file in image buffer database 33, but may transmit it directly to the user.

Figure 2:
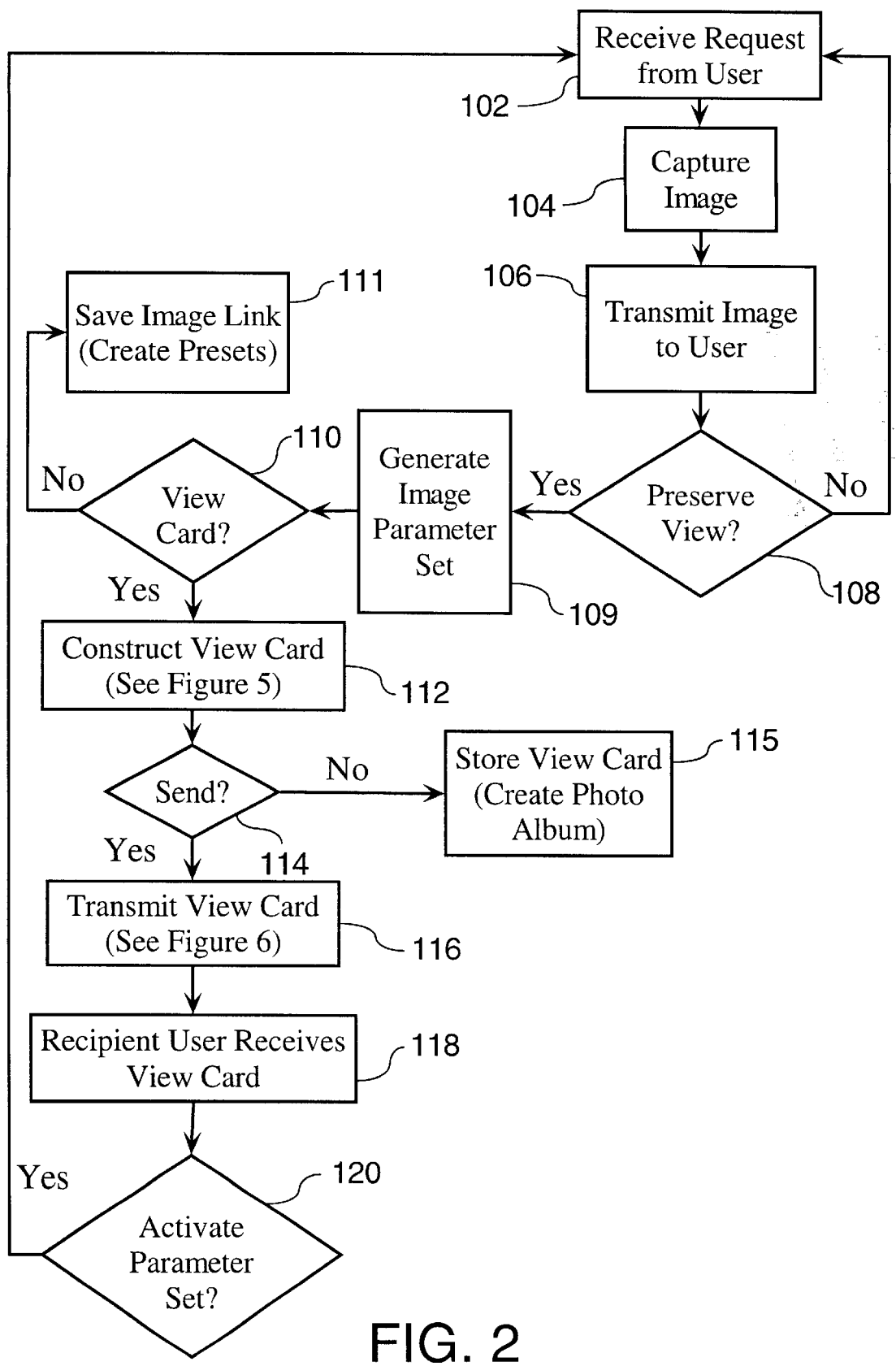
FIG. 2 is a flow-chart diagram illustrating a method according to the present invention.

According to the invention, server 32 transmits the image to the user (FIG. 2, step 106). In one embodiment, server 32 transmits interface data to the user including the image of the selected region of the remote physical location 60. In one embodiment, server 32 constructs a user interface (see, e.g., FIG. 3) which includes the requested image and transmits the interface to client computer 50. In one embodiment, the user interface is a page-based interface. More specifically, and according to this embodiment of the present invention, server 32 stores a page-based interface template containing certain tags, which are replaced with data, program code, and/or pointers to files, before the resulting page (interface data) is transmitted to the user. In one embodiment using HTML pages, to construct the page-based interface, server 32 replaces a tag reserved for the image with code that creates a HTML form containing the requested image as a standard HTML image map. In one form, the HTML form code contains a file name pointing to the requested JPEG image file (or other suitable format) stored in image buffer database 33. Accordingly, the image map, after the page has been transmitted to client computer 50, allows the user to click in the image 72 (see FIG. 3) of interface 70 to submit a request for a live image of a new selected region 62 in remote physical location 60.

In one form, the x- and y-coordinates corresponding to the point in the HTML image map at which the click occurred are transmitted to server 32 as part of a URL, constructed by browser 52, that also contains the pan, tilt, zoom and other camera parameters corresponding to the old image, contained in the HTML document as hidden fields. Using the positional parameters of the currently viewed image and the x- and y-coordinates of the image map, server 32 determines which one of cameras 22 and 24 (if more than one exist) to move and the positional parameters (pan, tilt and zoom values, in one embodiment) of such move necessary to capture an image of the selected region. The desired image is captured and a new page-based interface is generated and transmitted to the user as described above. Accordingly, the interface described in this embodiment allows the user to visually navigate through remote physical location 60 simply by clicking in the displayed image and/or specifying the desired magnification.

In yet other embodiments, the interface can be configured to allow the user to select a region in the remote physical location by designating an area in the displayed image, rather than just clicking at a particular point in the image. In one embodiment, the user may designate such an area by clicking in the image and dragging to create a box as is commonly found in many software applications. The interface then returns the coordinates of the box, rather than the x, y-point of the click, as described above, in order to request the image of the selected region.

Figure 3:
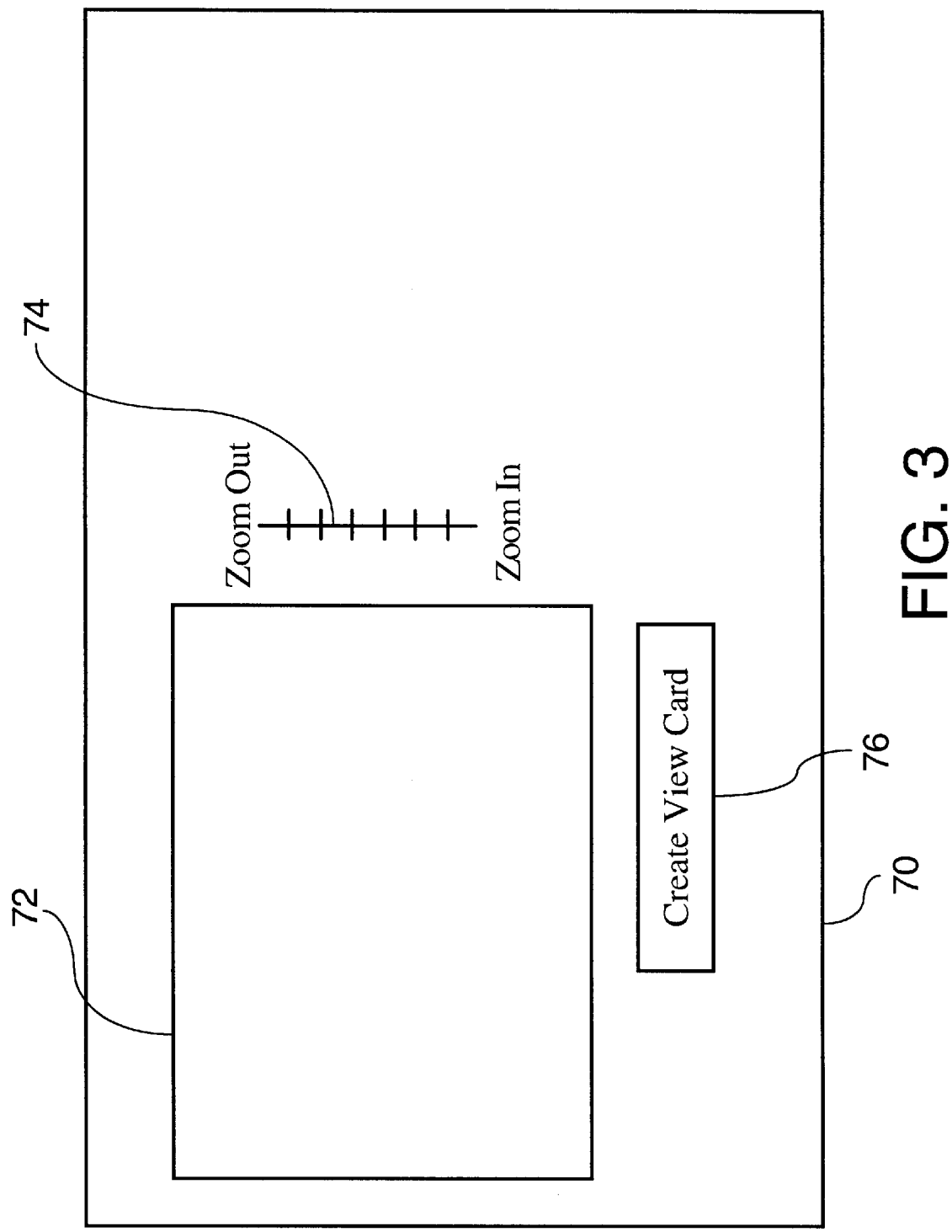
FIG. 3 illustrates one embodiment of a user interface according to the present invention.

FIG. 3 shows an embodiment of a user interface according to the present invention. As FIG. 3 illustrates, interface 70 includes image window 72 and interface controls. In the embodiment shown, interface controls include camera zoom control 74 and preserve view option 76. As alluded to above in the description of one embodiment, a digital representation of the captured image is added as an image map to interface 70 at image window 72. As described above, interface 70 allows the user to navigate through remote physical location 60 by transmitting requests to server 32 which points cameras 22 and 24 to selected regions of remote physical location 60. As FIG. 3 indicates, certain embodiments provide the user the ability to control the zoom or magnification of cameras 22 and 24. More specifically, interface 70 includes zoom control 74 offering various zoom values. In the embodiment shown, the user simply adjusts the zoom value and selects a point in the image to which he or she wishes to zoom. In one form, the user interface also includes a panoramic view to enhance the user's ability to navigate within a physical space. As with image window 72, the user may click in the image of the panoramic view to aim image acquisition system 20 at a new selected region. The new image is added to the interface template at image window 72 and transmitted to the user as discussed above. In this manner, the user may quickly navigate to other regions of remote physical location 60, even though the currently viewed image is zoomed in on a small region in remote physical location 60.

According to the invention, preserve view option 76 allows the user to preserve selected views of the remote physical location as he or she navigates through the remote physical location and save them for later use by the user (such as to create a set of preset views) or 2) communicate the selected view(s) to another user.

In one embodiment, if the user opts to preserve the view corresponding to the currently viewed image (FIG. 2, step 108), an image parameter set is generated (step 109). More specifically, the image parameter set required for image acquisition system 20 to recreate a new live view of the currently viewed image is recorded. In one embodiment, the image parameter set includes a camera identifier (for image acquisition systems including more than one camera), pan degrees, tilt degrees and zoom magnification. In other embodiments, the parameter set also includes image processing parameters such as size, compression and brightness. Of course, different camera and image acquisition systems may call for different positional and image processing parameters. In embodiments where image acquisition system 20 is connected to the Internet 40 (see FIG. 4), the domain or IP address of the image acquisition system is also recorded. In one embodiment, this image parameter set is stored in view card database 34. In one embodiment, the image parameter set is encoded into a URL and stored as an image link in view card database 34 or transmitted to the user. This image parameter set can be saved to create a collection of preset views of the remote physical location through which a user may subsequently step (FIG. 2, step 111). Alternatively, these image links may be sent to other users. In one embodiment, the collection of presets may comprise a plurality of image links. Alternatively, the user may opt to construct a view card (steps 110 and 112) and either transmit it to another user or save a collection of view cards to create a view card album (step 115).

In one embodiment, the view card comprises the image parameter set generated as described above and the current image of the selected region of remote physical location 60. As discussed above, this view card is then transmitted (either to the user or a recipient user designated by the user). The image parameter set in the view card can be activated to direct image acquisition system 20 to take a new live image of the selected region (defined by the parameter set) in the remote physical location (See FIG. 2, step 120). If the parameter set is encoded in a URL, the user need only copy the URL and paste it into the address bar of a web browser. If the parameter set is encoded in a URL and transmitted as an image link (such as a hypertext link), the user need only click on the image link to transmit the parameter set, via browser 52, to telepresence control system 30 and, ultimately, to image acquisition system 20, which captures a new live image of the selected region.

FIG. 5 illustrates an alternative method for constructing and transmitting a view card. According to this embodiment, image data corresponding to the currently viewed image is stored in view card database 34 in association with the image parameter set recorded above (FIG. 5, step 202). In one embodiment, server 32 also receives comments submitted by the user to be included in the view card and stores them in association with the image parameter set and image data (FIG. 5, step 204). In one embodiment, the view card is a HTML page comprising image data, the recorded parameter set encoded into a URL as a hypertext link, and comments (if any). This embodiment of the view card is constructed by accessing view card database 34 and assembling the page. In another embodiment, image data is stored in image buffer database 33; therefore, a pointer to the image data is stored in view card database 34 in association with the image parameter set. The view card is then transmitted to the user or a specified recipient user (FIG. 5, step 206).

In one embodiment, the view card is sent to the user as an attachment to an e-mail addressed to the user. In another embodiment, the view card is transmitted as a HTML document to browser 52 on client computer 50. In either of these embodiments, the URL which contains the encoded image parameter set may be embedded in the image as a hypertext link such that when the user clicks in the image, browser 52 constructs the URL containing the parameter set and transmits it to server 36. In one embodiment, when the link is activated, server 32 constructs a page-based interface 70, as discussed above, and transmits it to client computer 50 (See FIG. 2, steps 118 and 120).

In another embodiment, a URL (view card identification) pointing to the view card stored in view card database 34 is transmitted (FIG. 5, step 206). In one embodiment, this URL points to a view card comprising a HTML document, similar to that discussed above. In another form, the URL points to a dynamic script which runs when the user initiates the URL. In this form, view card database 34 includes records having fields for the recorded image parameter set, a URL pointing to the image data file stored in image buffer database 33, and comments (if any). The dynamic script extracts the fields from the record corresponding to the particular view card identification and replaces tags in a view card template with the appropriate data. Under this approach, the look and feel of the view card can be changed (by editing the template) after the user has specified its contents. In one embodiment, the view card constructed and displayed to the user is a HTML document comprising the image and a URL which encodes for the parameter set defining the corresponding live view. In one form, this URL is embedded as a hypertext link in the displayed image, such that it is transmitted to server 36 when the user clicks in image window 72 (see FIG. 3) and activates the link to the live image source.

FIG. 6 illustrates a method for use when the user opts to construct and send a view card to a recipient user. If the user opts to preserve the view (FIG. 2, step 108), construct a view card (step 110) and send it to another user (step 114), server 36 receives a recipient address (FIG. 6, step 302). Optionally, server 36 receives comments to be included in the electronic message. In one embodiment, the field information entered by the user is checked for errors (FIG. 6, steps 308 & 310). If the field information is correct, an electronic message is constructed and transmitted to the recipient address (FIG. 6, steps 312 & 314).

The electronic message transmitted to the recipient address may take many forms. In one form, the view card itself is transmitted as an attachment to a conventional e-mail. In another form, the e-mail contains the view card as a HTML document. In yet another form, the electronic message notifies the recipient user that a view card has been generated and provides the user a URL identifying the view card (view card identification). In one embodiment, this URL includes the path and filename of the view card. For example, such an electronic message may contain a short notification that the recipient has a view card from the sender. This electronic message also contains a view card identification URL pointing to a view card stored in view card database 34 or, as discussed above, to a view card identification dynamic script that generates a view card from a template and the information entered by the user.

The view card of the present invention may also take many forms. In one embodiment shown in FIG. 7, the view card includes the image 82 captured by the user when the preserve view option was selected, a URL having the image parameter set required for a new live image, and the comments 84 (if any) entered by the user. In another embodiment, the user's comments can be overlaid over the image included in the view card. In another embodiment, the URL is embedded as a hypertext link in the displayed image, which can be activated to retrieve a new live image corresponding to the image parameter set. In other embodiment, the view card may also contain supplementary graphics and text to enhance the appearance of the view card. Furthermore, if the camera system includes a video camera, the view card can contain a video stream segment, which runs when the user clicks in the image. A URL can also be provided to return a live view of the remote physical location.

In an alternative embodiment, the view card comprises a captured image of the selected region in the remote physical location that provides the recipient user the ability to direct image acquisition system 20 to a new selected region in the remote physical location and capture an image thereof. In one embodiment, the view card comprises a HTML document including the captured image as a standard image map which returns the x- and y-coordinates of the point on which the user clicks. As discussed above, the x- and y-coordinates corresponding to the point in the HTML image map at which the click occurred are transmitted to server 32 as part of a URL, constructed by browser 52, that also contains the pan, tilt, zoom and other camera parameters corresponding to the old image, contained in the HTML document as hidden fields. Using the old image parameters and the x- and y-coordinates of the image map, server 32 determines which one of cameras 22 and 24 (if more than one exist) to move and the positional parameters (pan, tilt and zoom values, in one embodiment) of such move necessary to capture an image of the selected region. In one embodiment, the desired image is captured and a new page-based interface is generated and transmitted to the user as described above. Accordingly, the view card described in this embodiment allows the user to visually navigate through remote physical location 60 simply by clicking in the displayed image. In another embodiment, the view card allows the recipient user to specify a desired magnification for the live image.

In another embodiment, the view card includes a semantic link, which gets resolved by database software into the URL corresponding to the appropriate selected region in the remote physical location. For example, a user may preserve a view of a particular item 66 in remote physical location 60 and store a semantic link to this item. According to this aspect of the invention, the actual image parameters corresponding to an item in 66 in selected region 62 are stored in a database in association with the semantic link. Accordingly, when the user activates the semantic link, it is resolved into the image parameters stored in the database. According to this embodiment, if the location of item 66 in remote physical location 60 is changed, the image parameters corresponding to the new selected region are stored in the database in association with the semantic link.

With respect to the above-provided description, one skilled in the art will readily recognize that the present invention has application in a variety of contexts. The foregoing description illustrates the principles of the present invention and provides examples of its implementation. Accordingly, the description is not intended to limit the scope of the claims to the exact embodiments shown and described.

What is claimed is:

1. A system for preserving and communicating live views of a remote physical location over a computer network comprising
    an image server,
    an image acquisition system operably connected to the image server,
        wherein said image acquisition system captures and transmits images of selected regions in a remote physical location in response to control signals transmitted by the image server;
        wherein the image server is operative to transmit control signals to the image acquisition system in response to quests for images of selected regions in the remote physical location;
    wherein the image server, in response to a view card request from a first user designating a selected region of the remote physical location, is further operative to generate and transmit a view card to a recipient user,
    wherein the view card includes a link operative to direct the image acquisition system to capture and transmit a new live image of the selected region designated in the view card request.

2. The system of claim 1 wherein the view card further includes the image of the selected region associated with the view card request.

3. The system of claim 1 or 2 the image server generates an image parameter set in response to a view card request, wherein the parameter set defines the selected region in said remote physical location associated with the view card request; and
    wherein image parameter set is encoded in the link associated with the view card.

4. The system of claim 3 wherein the image parameter set defines the selected region in relation to the positional parameters of the image acquisition system.

5. The system of claim 3 further comprising a view card database, wherein the image server, in response to a view card request, is operative to generate a unique view card identification; wherein the image server is further operative to store the view card identification and the corresponding image parameter set in the view card database.

6. The system of claim 5 wherein the image server is further operative to store the image corresponding to the view card request in association with the view card identification.

7. The system of claim 5 wherein the link in the view card is encoded with the view card identification and is operative to cause the image server to:
    retrieve the corresponding image parameter set from the view card database, and
    transmit a request for a new live image to the image acquisition system, wherein the request includes the image parameter set.

8. The system of claim 1 or 2 further comprising:
    a user interface coupled to said computer network, said user interface is operative to: display images transmitted by the image server;
    facilitate the selection of regions in the remote physical location; and
    transmit requests for image of selected regions in the remote physical location to the image server; and
    transmit view card requests corresponding to displayed images.

9. The system of claim 8 wherein the image server transmits page-based interfaces, each page-based interface including an image of a selected region in the remote physical location, said page-based interface including a command option operative to generate a view card request corresponding to the currently viewed image.

10. The system of claim 9 wherein the page-based interface includes a field allowing for entry of a computer network address associated with the designated user.

11. A method for preserving live views of a remote physical location over a computer network, said compute network carrying and routing data between computers connected thereto, said compute including at least one client computer associated with one or more users, and an image server, said image server coupled to at least one image acquisition system, said image acquisition system(s) located in respective remote physical locations, said method comprising the steps of
    receiving, at the image server, a request from a first user for a live image of a selected region in a remote physical location;
    transmitting control signals to an image acquisition system to capture and return an image of the selected region associated with the request;
    transmitting the image to the first user;
    receiving, from the first use, a request to preserve the view associated with the image of the selected region, wherein the request includes a designated recipient user;
    generating a view card, wherein the view card includes a link operative to direct the image acquisition system to capture and transmit a new live image of the selected region associated with the view card request; and
    transmitting the view card to the designated recipient user.

12. The method of claim 11 wherein the generating step comprises
    generating an image parameter set, wherein the parameter set defines the selected region in said remote physical location associated with the view card request;

constructing a link operative to transmit a request for a new live image including the image parameter set.

13. The method of claim 12 wherein the constructing step comprises encoding the image parameter set in a hypertext link operative to transmit an image request to the image server.

14. The method of claim 12 or 13 wherein the image parameter set defines the selected region in relation to positional parameter with the image acquisition system.

15. The method of claim 12 wherein the generating step comprises generating an image parameter set, wherein the parameter set defines the selected region in said remote physical location associated with the view card request;

storing the image parameter set in a database;

constructing a link operative to transmit a request for a new live image to the image server, said link operative to cause the image server to extract the image parameter set from the database and transmit the image parameter set to the image acquisition system.

16. The method of claim 11 wherein the view card further comprises the image of the selected region.

17. A system for preserving and communicating live views of a remote physical location over a computer network comprising an image server, an image acquisition system operably connected to the image server, wherein said image acquisition system captures and transmits images of selected regions in a remote physical location in response to control signals transmitted by the image server;

wherein the image server is operative to transmit control signals to the image acquisition system in response to requests for images of selected regions in the remote physical location;

wherein the image server, in response to a view card request from a first user designating a selected region of the remote physical location, is further operative to generate and transmit a view card to a recipient user, wherein the view card includes a link containing at least one parameter defining the selected region relative to the image acquisition system, and wherein the link, when activated, is operative to direct the image acquisition system to capture and transmit a new live image of the selected region designated in the view card request.

* * * * *